United States Patent
Piscopo, Jr.

(10) Patent No.: US 12,531,949 B2
(45) Date of Patent: Jan. 20, 2026

(54) OUT-OF-BAND CALL AUTHENTICATION USING PSEUDO CALL ROUTING

(71) Applicant: FIRST ORION CORP., North Little Rock, AR (US)

(72) Inventor: Robert Francis Piscopo, Jr., Saint Petersburg, FL (US)

(73) Assignee: FIRST ORION CORP., North Little Rock, AR (US)

( * ) Notice: Subject to any disclaimer, the term of this patent is extended or adjusted under 35 U.S.C. 154(b) by 196 days.

(21) Appl. No.: 18/230,519

(22) Filed: Aug. 4, 2023

(65) Prior Publication Data

US 2025/0047790 A1   Feb. 6, 2025

(51) Int. Cl.
*H04M 7/00* (2006.01)
*H04M 3/436* (2006.01)
*H04M 3/54* (2006.01)

(52) U.S. Cl.
CPC ......... *H04M 7/0081* (2013.01); *H04M 3/436* (2013.01); *H04M 3/54* (2013.01)

(58) Field of Classification Search
CPC ....... H04M 7/0081; H04M 3/436; H04M 3/54
USPC ........................................................ 379/165
See application file for complete search history.

(56) References Cited

U.S. PATENT DOCUMENTS

| | | | | |
|---|---|---|---|---|
| 8,077,702 B2 * | 12/2011 | Blomkvist | ........ | H04M 3/42076 379/142.01 |
| 9,325,839 B2 * | 4/2016 | Bender | ............ | H04M 3/42059 |
| 10,122,851 B2 * | 11/2018 | Algard | ............. | H04M 3/42102 |
| 10,218,839 B2 * | 2/2019 | Gupta | ................... | H04M 3/382 |
| 10,375,238 B1 * | 8/2019 | Stephens | ............ | H04M 7/0078 |
| 11,671,468 B2 * | 6/2023 | Carney Landow | ... | H04M 1/575 370/352 |
| 2011/0176449 A1 | 7/2011 | Robbins | | |
| 2016/0080563 A1 | 3/2016 | Torres et al. | | |
| 2016/0219142 A1 * | 7/2016 | Brown | ................ | H04W 68/005 |
| 2016/0353315 A1 | 12/2016 | Li et al. | | |
| 2017/0104870 A1 * | 4/2017 | Mandanapu | .......... | H04M 3/436 |
| 2021/0099573 A1 * | 4/2021 | van Rensburg | ....... | H04L 9/0894 |
| 2021/0144243 A1 * | 5/2021 | Aroxa | ............... | H04M 3/42042 |
| 2022/0078279 A1 * | 3/2022 | Murphy | ............ | H04M 3/42102 |
| 2022/0086274 A1 * | 3/2022 | Knuth | ............... | H04M 1/72469 |
| 2022/0103681 A1 * | 3/2022 | Prodanovic | ............. | H04L 67/00 |

(Continued)

FOREIGN PATENT DOCUMENTS

| | | |
|---|---|---|
| EP | 3796627 A1 | 3/2021 |
| WO | 2022051091 A1 | 3/2022 |

OTHER PUBLICATIONS

Extended European Search Report issued in the EP Patent Application No. 24164838.5, mailed on Sep. 12, 2024.

*Primary Examiner* — Binh Kien Tieu

(57) ABSTRACT

An example provides performing a pseudo-call operation to obtain call information and sharing the call information prior to placing the actual call, the example may include receiving a call invite message from an out of band network, transmitting a call alert message to a terminating network indicating a time period, a calling number and a called number, receiving a call at the terminating network from another network, determining whether the calling number and the called number match the received calling number and the called number and the call was received within the time period, and pairing call content with the call.

20 Claims, 4 Drawing Sheets

(56) References Cited

U.S. PATENT DOCUMENTS

2022/0247859 A1 8/2022 Prodanovic et al.
2023/0164198 A1 5/2023 Bhattacharjee et al.

* cited by examiner

400

OUT-OF-BAND CALL AUTHENTICATION USING PSEUDO CALL ROUTING

BACKGROUND

Conventionally, caller identification (ID) spoofing refers to the practice of manipulating the information displayed on a recipient device caller ID display to make it appear as if the call is originating from a different phone number or entity than the entity that is actually performing the call. This scam technique is commonly used by scammers and fraudsters to deceive and defraud unsuspecting individuals to trick call recipients into believing they are receiving a call from a known or trusted party.

Caller ID spoofing provides scammers with the capability to mask their true identity and make their calls appear legitimate. By manipulating the caller information displayed on the recipient's call device, scammers can make it seem like the call is coming from a trusted source, such as a government agency, financial institution, or well-known company. With this deceptive tactic, scammers can execute various fraudulent schemes. They might impersonate bank representatives, claiming there is an urgent issue with the recipient's account and tricking them into revealing sensitive personal information, such as passwords, account numbers, or social security numbers. Alternatively, scammers might pose as technical support agents, warning individuals of non-existent computer issues and convincing them to grant remote access to their devices, enabling the scammers to install malware or steal valuable data.

STIR/SHAKEN (secure telephone identity revisited/signature-based handling of asserted information using tokens) is a framework designed to combat caller ID spoofing and restore trust in phone call identification systems. The system works by implementing digital certificates and cryptographic signatures that enable service providers to verify the authenticity of caller ID information. When a call is made, the originating service provider signs the call with a digital certificate, indicating that the caller ID information has been validated. The call then passes through the network, and the recipient's service provider can verify the signature and ensure that the Caller ID information is legitimate.

By implementing STIR/SHAKEN, legitimate service providers can distinguish between legitimate calls and those with spoofed caller ID information, making it more difficult for scammers to deceive unsuspecting individuals. This technology helps restore confidence in caller ID systems, enhancing call authentication and enabling individuals to make more informed decisions when answering or trusting incoming calls.

While STIR/SHAKEN is an effective framework for combating caller ID spoofing, there are certain cases where signing cannot be performed or where the signature may not reach the terminating service provider (TSP). These situations include calls originating from international networks that do not support STIR/SHAKEN implementation or calls made between service providers that have not yet adopted the framework. Additionally, calls that pass through intermediate networks or undergo complex call routing processes may encounter challenges in transmitting the signature to the TSP.

In the cases where authentication via STIR/SHAKEN cannot be achieved, it may be possible to authenticate the call by relaying information from the call originator to the TSP about a call being out-of-band, meaning the call is sent via signaling which is outside of the SIP signaling used to setup the call when the STIR/SHAKEN signature is transmitted.

SUMMARY OF THE APPLICATION

Example embodiments of the present application provide at least a method that includes at least one of receiving a call invite message from an out of band network, transmitting a call alert message to a terminating network indicating a time period, a calling number and a called number, receiving a call at the terminating network from another network, determining whether the calling number and the called number match the received calling number and the called number and the call was received within the time period, and pairing call content with the call.

Another example embodiment provides a receiver configured to receive a call invite message from an out of band network, a transmitter configured to transmit a call alert message to a terminating network indicating a time period, a calling number and a called number, and the receiver is configured to receive a call at the terminating network from another network, and a processor configured to determine whether the calling number and the called number match the received calling number and the called number and the call was received within the time period, and pair call content with the call.

Yet another example embodiment may include a non-transitory computer readable storage medium configured to store instructions that when executed cause a processor to perform receiving a call invite message from an out of band network, transmitting a call alert message to a terminating network indicating a time period, a calling number and a called number, receiving a call at the terminating network from another network, determining whether the calling number and the called number match the received calling number and the called number and the call was received within the time period, and pairing call content with the call.

DETAILED DESCRIPTION

Figure 1:
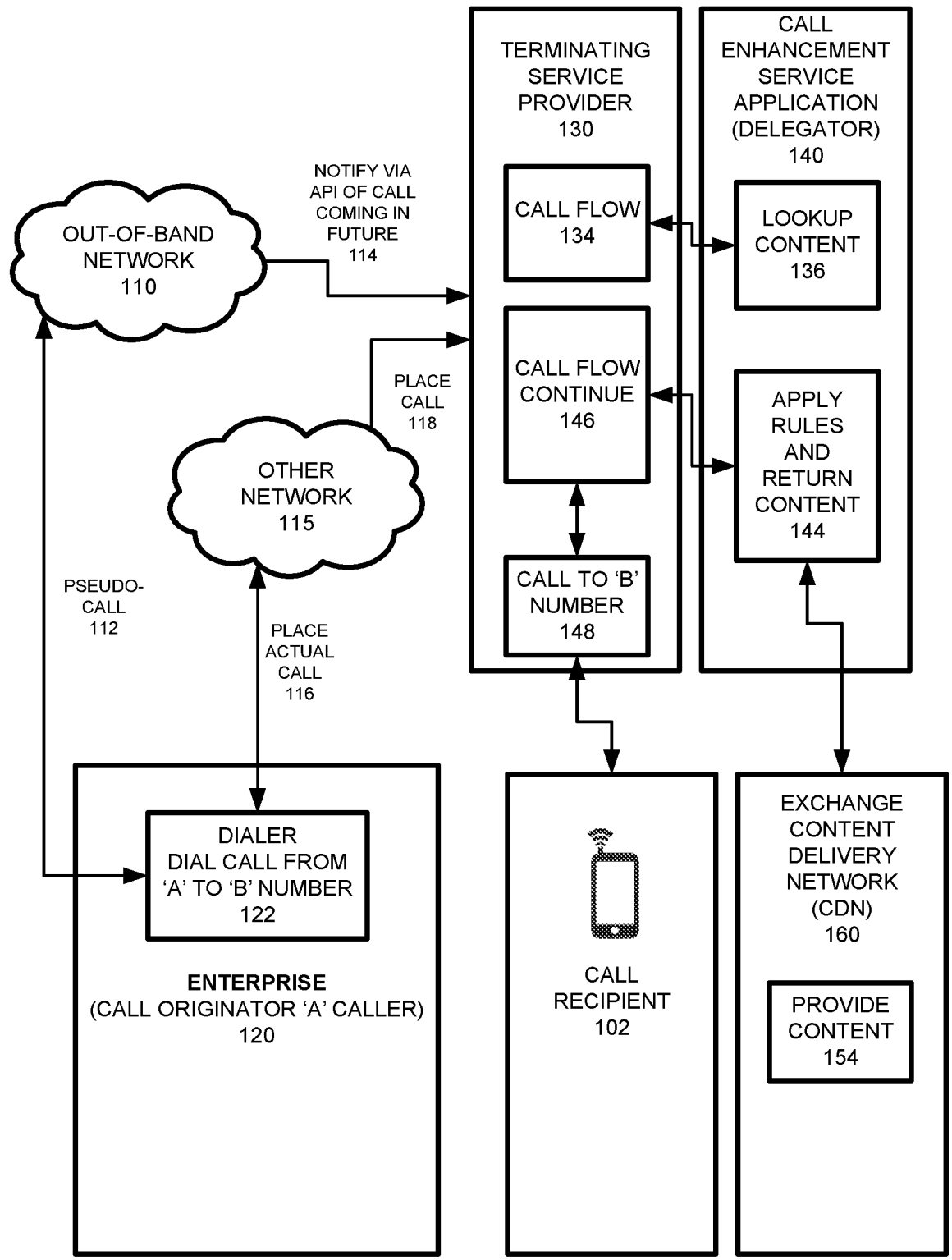
FIG. 1 illustrates a call network configuration including a pseudo-call and actual call placement process according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call content management of content shared with and incorporated with calls placed to and from mobile device users. Enterprise entities (e.g., government, corporate, etc.) may desire to have their services readily identified by images, symbols, video, text, etc., to mobile device users when providing appointments, services, advertising, etc. Mobile device users require secure communication channels to reduce fraud associated with scam callers and other falsified entities seeking to monetize from users by using unexpected and undesirable approaches, such as solicitation calls and mobile device messages (SMS).

Call enhancement services (CES) may be provided as a communication exchange ("exchange"), a call enhancement service application (CESA), and/or a content delivery network (CDN). Each entity of the call enhancement platform may be an enterprise server, a cloud server, and/or separate or common server devices which are accessible by mobile devices, enterprise entities and other third parties which are participating in the call enhancement process. The CESA may be deployed within a dedicated network 'delegator' device but does not have to be limited to one particular entity in a private network and/or via a cloud computing network. The 'exchange' is a call and data processing computer or other processing entity that manages a branded calling program(s). A 'program' is a group of content/assets, a schedule, and other information that utilizes call data, such as associated telephone numbers, and provides pairing and matching of information for transfer purposes. An organization can have more than one program operating concurrently, and the program that is selected/usable at any particular time may be based on call requirements, except for the case of a pre-call function, in which a valid schedule is required to deliver branded communications. Programs can be created, deleted, and updated. Schedules, telephone numbers, and assets can be added, deleted, and updated. Data inputs provided to the 'exchange' may come from a customer portal or lightweight APIs or both. The 'exchange is also the provisioning entity to the CESA that delivers the branded calling experience to a service provider. The 'exchange' uses brokers to facilitate the program's data management with the CESA. A valid program is required along with a validity schedule. Pre-call functionality defines the calling/called number pair for a specific upcoming call and any limited period of time in which the call must be placed.

The CESA is responsible for implementation of branded calling programs in real-time during a terminating call setup process of a call. The CESA will utilize the valid program information from the exchange as well as the capability of fetching up-to-date data in real-time. The CESA can be a hosted solution or in a service provider's network, in either scenario, the CESA must brand calls based on matching incoming call signaling data with an exchange program by applying policies and interworking the company assets into the call signaling stream upon a successful match of caller 'A'/callee 'B' data with stored call data.

For purposes of this disclosure, the denoted 'A' entity/caller will be a call originator, such as an enterprise entity that dials a call to another entity, such as an end user or call recipient 'B' entity/callee. In one example, the 'program' may provide a picture or brand logo which can be quite large with respect to a user mobile device interface. Instead of attempting to pass such rich content or enhanced call content assets in-band during call setup, the assets may be placed in a content delivery network (CDN), for example a cloud resource network and the URL of the asset may be provided with the call signaling for the terminating device to fetch. The CDN may be used to store certain content and/or enhanced content ahead of a call and a terminating device may retrieve the content and share the content with the called device in the event that the enhanced content is not already stored or shared with the called device.

FIG. 1 illustrates a call network configuration including a pseudo-call and actual call placement process according to example embodiments. Referring to FIG. 1, according to one example embodiment, an INVITE (e.g., SIP invite) may be sent to participate in a call session as part of a pseudo-call. The protocols used for communication, routing and other operations may be session initiation protocol (SIP) based signaling, however, other call communication protocols may also be used by those skilled in the art. Once an invite is sent as part of a pseudo-call 112 from an originator calling entity 120 via a call dialer 122, such as an enterprise (company) to a particular network, such as an out-of-band network 110 or alternative call routing network, a response may be sent to the originator entity, such as a SIP 100 trying message. Timers may be set to track the call progress over time. The pseudo-call purpose is never to create an end to end live call but only to identify certain call routing criteria and information which could be used in an actual call at a later time.

The call progress may be tracked by additional call parameters to indicate that the call is progressing and to keep the call alive. Information about the call progress and call route may be identified and logged, such as a session Internet protocol (IP) port and other call information. A timer may be set on the originating side to track the call progress over time. Additional timers may be used to avoid having the call drop prior to call routing progress being made even though the initial call routing may be intended to only secure call routing information prior to intentionally dropping the call and placing another call (actual call) on a different route based on the information obtained from the pseudo-call placed prior to the actual call.

The pseudo-call may be initiated with a SIP INVITE messages and will contain more information than just the calling 'A' and called 'B' party numbers. For instance, the call may include information about call codecs which could be used, such as a session description protocol (SDP) offer, call forwarding information (e.g., history information, diversion headers, etc.), enhanced content, such as a display name included in a display name field of the 'P-Asserted-Identity' and/or 'From' headers. Additional call information may include other enhanced content, such as logo web link information (e.g., 'Call-Info' header), custom information the call originator wanted to send (e.g., using X-headers, or P-headers). By performing the pseudo-call, the terminating network will have knowledge of the call before the actual call happens. The out-of-band network call may include notifying 114 via an API the terminating network service provider 130 of a future call. The terminating network 130 may initiate a call flow 134 based on content identified 136 to be paired with the call as provided from a CESA 140. After the terminating service provider network 130 has the notification of a future call, certain call parameters may be logged in memory for a period of time (Tc) used to denote a period of time when the call is going to be placed.

Subsequently, after placing the pseudo-call, the call originating side may end the call by a conventional SIP signaling message or by letting the call go abandoned and time out at some point in time dictated by the call routing timer information. A call may then be placed 116 by the same entity on a different call route or network 115 which attempts to connect a call 118 with the terminating service provider 130. The call information obtained during the pseudo-call may include a call origination number, a call termination number, time required to place the call (Tc) based on timer information recorded by the timer during the pseudo-call setup. The terminating side may require the 'A' number (calling number) and the 'B' number (called number) and the two numbers may be paired with call campaign enhanced data, such as media, words, links, and/or a reason for the call, etc.

The call numbers and related information can be shared with the termination side of the call prior to an actual call being placed. An application programming interface (API) may be used to notify the terminating side from an out of band and/or different network than will be used to place the call, that a call may be expected within a particular period of time from a particular caller number and destined for a particular callee number (A/B number pair) along with other information as a way to pre-authorize the call and reduce the likelihood that a call spoof attempt is being performed. This approach helps the call source (originator) demonstrate that they are about to make a call, and thus no 'spoofer' or fraudulent entity is part of the call that is about to arrive from the particular call related numbers.

During the actual call process 118, the terminating service provider 130 will initiate a call flow 146 which applies call content rules, such as including certain content 144 retrieved from an exchange content delivery network (CDN) 160 as an entity that stores the call programs and call content that should be included with the call. The content provided 154 is based on the instructions in the call program. The call recipient 102 may then be called by the terminating network based on the 'B' number of the call 148. The call content is also sent with the call if the terminating service provider can match the information included in the pseudo-call notification with the actual call subsequently received.

Figure 2:
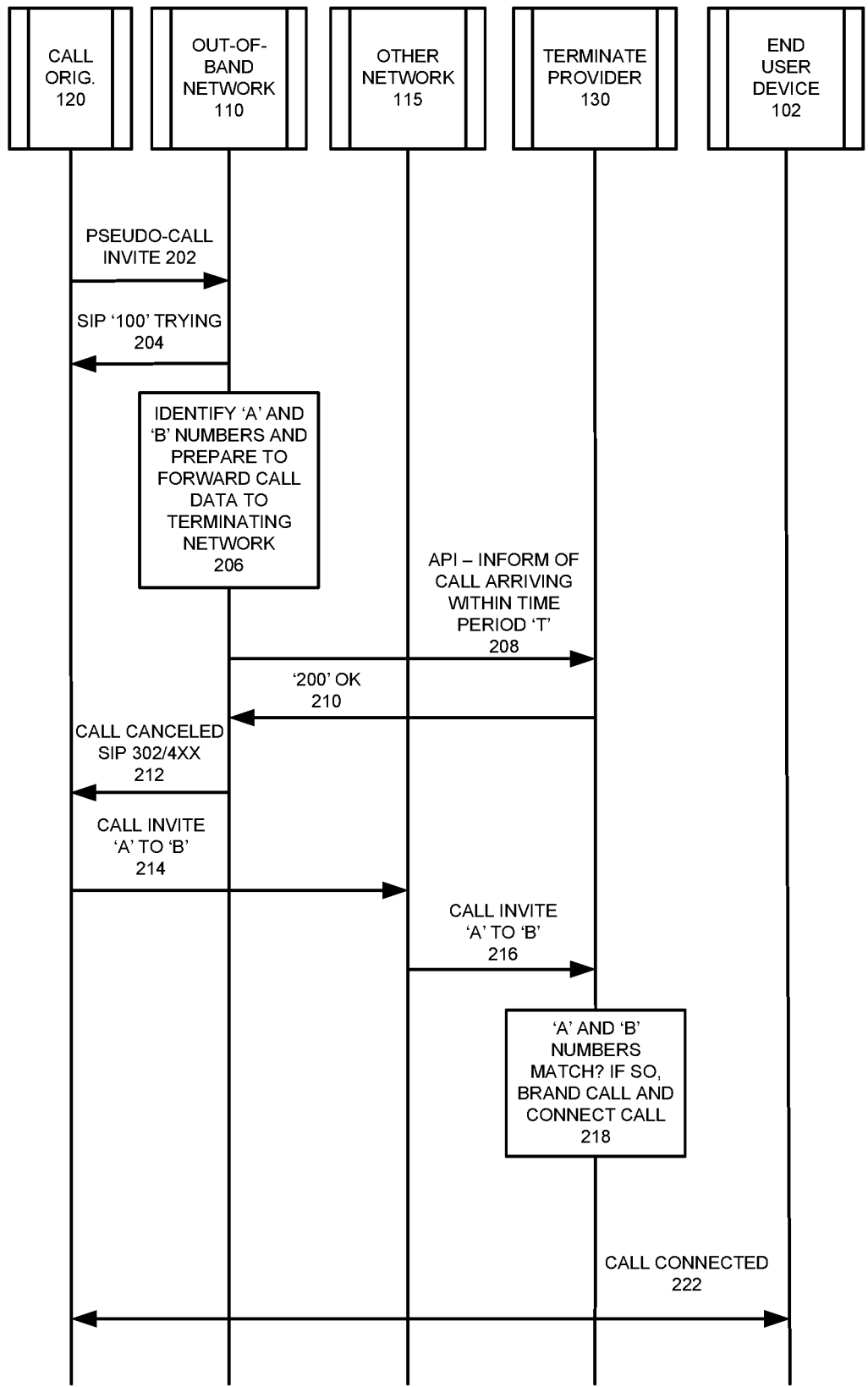
FIG. 2 illustrates a system configuration of a pseudo-call and actual call placement process according to example embodiments.

FIG. 2 illustrates a system configuration of a pseudo-call and actual call placement process according to example embodiments. Referring to FIG. 2, the configuration 200 includes a call originator 120 performing a pseudo-call via an out-of-band authentication which uses SIP redirect or failover routing on the originating side of the call to obtain information about a call that will be subsequently setup.

In operation, the call originator sets up a new secured SIP route to the out-of-band authentication network 110. The new connection can be a direct connection over a dedicated IP connection, SIP over transport layer security (TLS), SIP over a virtual private network (VPN), or any other industry recognized secure connection for transporting SIP based call signaling. The call originator 120 sets up routing tables to use this new route for all the originating SIP calls which they want authenticated and the route that was previously routing traffic over can be setup as a secondary failover route for the same calls.

The call originator 120 initiates a pseudo-call 202. The call is routed over the new route to the out-of-band network 110 via SIP. A SIP INVITE 202 may be sent, which contains the 'To' and 'From' SIP headers which included the called party and calling party telephone numbers (A/B) respectively. The out-of-band network sends a SIP 100 trying message 204 back to the originator. This example includes standard SIP signaling being used to let the originator 120 know that the INVITE was received and work is being done to try to fulfill the routing request even though the call will never be connected.

The out-of-band network 110 parses the SIP INVITE to obtain the calling and called party numbers. The out-of-band network sends an API message 206 to the terminating network provider 130 to inform the network to expect an incoming call from the calling party number 'A' to the called party number 'B'. The API message could contain timer information, for instance to expect the call within 'X' number of seconds or within a period of time 'T' 208. Another option is for the timer to be configurable in the terminating network 130. The notification is an alert to the terminating network 130 that an inbound call from a particular number to another particular number is to be expected "soon" (within a set amount of time) and if a call matching that information is received then it can be considered to be a call from a known/vetted/trusted entity. Inbound calls which do not match what is expected within the expected timeframe or which have not been authenticated in some other way are to be considered suspect and possibly spoofed and may be ignored.

The terminating network responds with a 200 OK (or some other positive response) signaling 210 that it has received the information and is now expecting a call with the parameters given. The out-of-band network 110 then signals back to the originator that it cannot complete the call requested in the INVITE. This could be achieved by sending a SIP 302 instructing the originating call source to cancel and/or redirect the call to a specific location, such as a normal route the call would normally have taken, a new secondary failover route, etc. The call cancellation 212 could also be achieved by sending an error message back to the originating system which causes the system to route advance to the failover route. The origination location may then retry the call over a secondary route.

A call with the same calling and called party numbers as the INVITE sent in operation 202 may then be sent over the secondary/preferred/failover route. The call does not necessarily need to be sent over a SIP connection, and could be an ISUP trunk or any other routing method known to those skilled in the art. The intermediate carrier or carriers of the other network 115 can then receive 214 and send 216 the call to the terminating network. The terminating network 130 may then look up the calling and called numbers from the inbound call and if they match what was previously sent by the out-of-band network (as recalled from memory) and the call received was within the allotted time frame (Tc), then the terminating network carrier 130 can affirm the call was received from an originator that has been vetted/authorize by the out-of-band network and the call can be considered authenticated 218. Conversely, if the calling and called party numbers of the inbound call do not match a calling and called party number pair previously sent by the out-of-band network, or there is a match, but the call was not received within the allotted time, then the call can be considered to not be authenticated by the out-of-band network service.

In the event that the terminating network 130 decides to route the call to the end user device 102 based on the knowledge that the call has been authenticated, then the call will be completed. It should be noted that additional call related services could also be applied at the terminating network 130 based on the out-of-band authentication status, such as call branding including pairing the call with enhanced call content on authenticated calls and call tagging or call blocking for calls which are not authenticated. By using call information sent with an INVITE sent via a primary call route to relay out-of-band call information to a terminating network about the validity of a call it is about to receive via a failover route is a call process that is able to provide authentication by call routing operations based on a pseudo-call operation performed prior to an actual call.

The pseudo-call cancellation or call ending may occur when the terminating network is provisioned with the call information necessary to "expect" the actual call, and this includes the call information about how to handle the actual call once the actual call is expected to be received in a period of time. A SIP '302' message, a 4xx message, or any other SIP message may be used to make the originating network cancel the pseudo-call through the pseudo call route and route the actual call to the next route (e.g., the failover route) which is the route that will actually be used to get the call to the terminating network to complete the call.

After the pseudo-call, the terminating network may store the A-B number pair, the timer information, such as a predefined time window to expect the call and the other call information needed to enact the actual call (e.g., a display name for P-Asserted-Identity, 'From' headers, a text String for the subject header, a 'Call-Info' header, such as an organization header). This approach provides a way for the originating side to provision a call. The call process may include scheduling two calls, the pseudo-call and the actual call, the application may set a period of time to ensure the pseudo-call has been placed and the call information is sent and used by the terminating network as a reference for the actual call to be received in a predefined period of time. The call originator may send both the pseudo-call and the actual call at two different times and may require a confirmation from the terminating network that the pseudo-call information was received prior to enabling the actual call.

Figure 3:
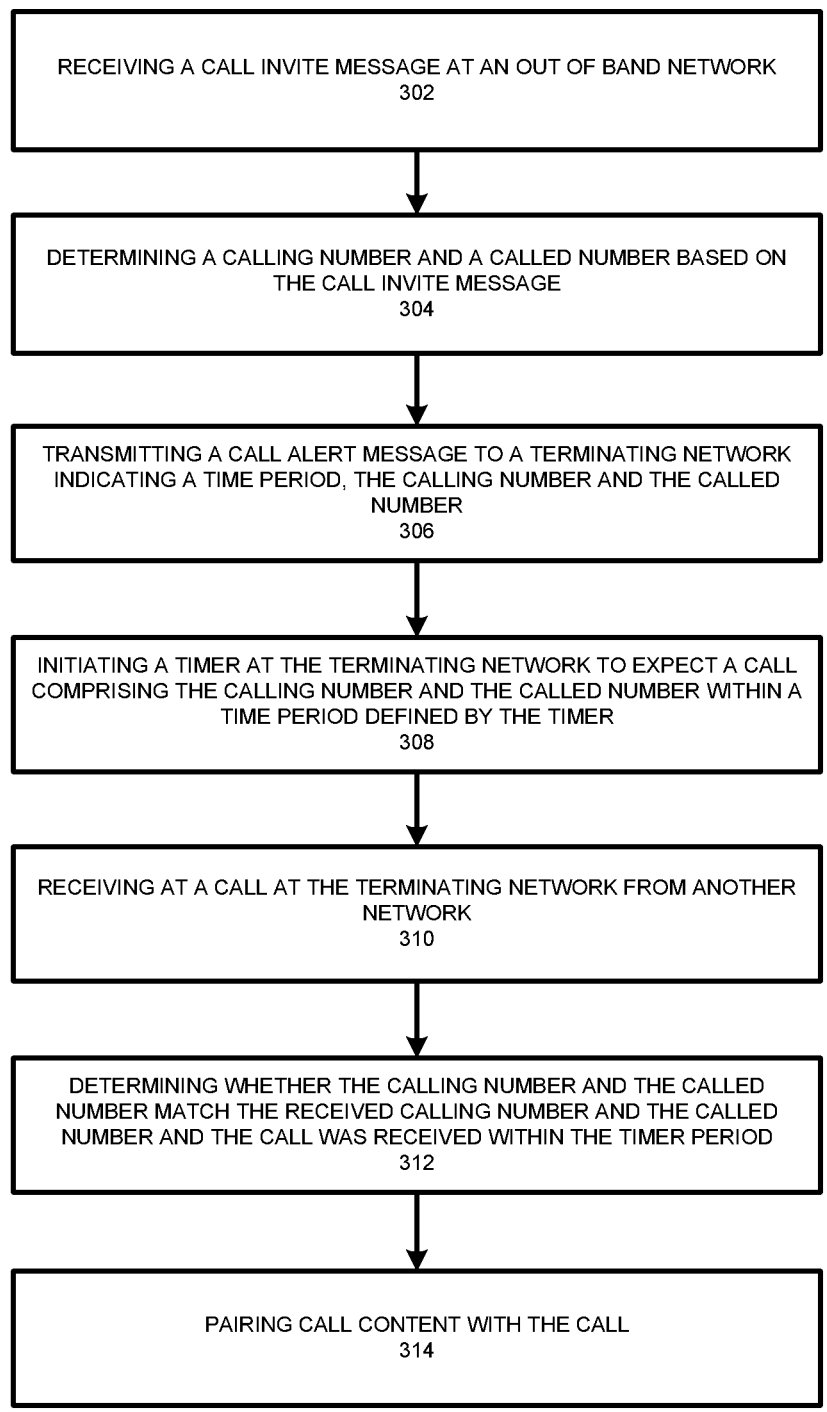
FIG. 3 illustrates a flow diagram of a pseudo-call and actual call placement process according to example embodiments.

FIG. 3 illustrates a flow diagram of a pseudo-call and actual call placement process according to example embodiments. Referring to FIG. 3, the example method may include receiving a call invite message at an out of band network 302, determining a calling number and a called number based on the call invite message 304, transmitting a call alert message to a terminating network indicating a time period, the calling number and the called number 306, initiating a timer at the terminating network to expect a call comprising the calling number and the called number within a time period defined by the timer 308, receiving a call at the terminating network from another network 310, determining whether the calling number and the called number match the received calling number and the called number and the call was received within the timer period 312, and pairing call content with the call 314.

The process may also include transmitting a call trying message to a call originator after the call invite message is received. The process may also include parsing the invite message to identify the calling number and the called number, initiating an application programming interface (API) at the out of band network to perform transmitting the call alert message to the terminating network, and cancelling an initial call sent from the call originator to the out of band network after the out of band network identifies the calling number and the called number. The process may further include initiating another call at the call originator to the another network. The call invite message may be part of a pseudo-call never intended to create a call circuit and which will be cancelled in place of an actual call placed within the time period defined during the initial call setup.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4:
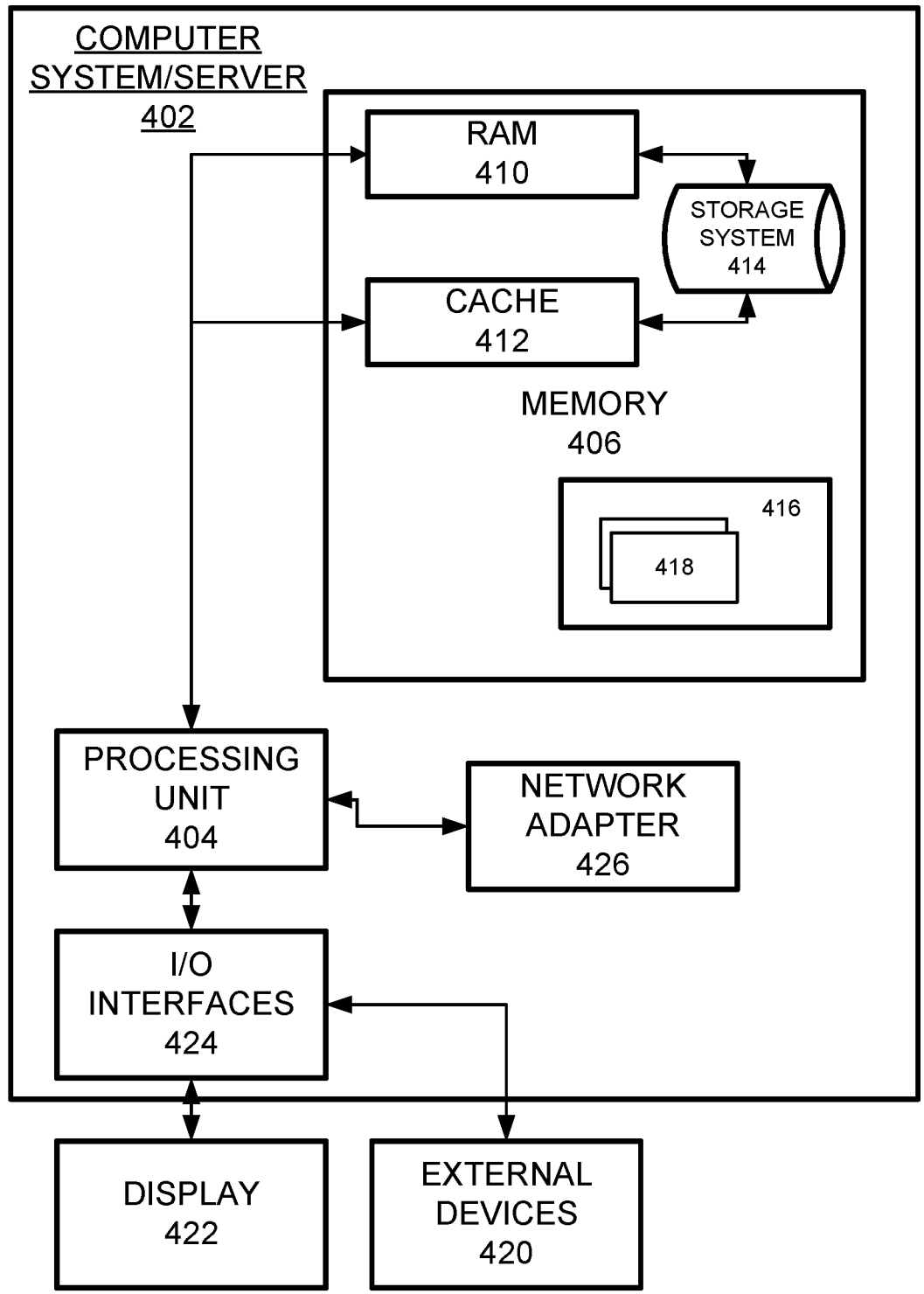
FIG. 4 illustrates an example network entity device configured to store instructions, software, and corresponding hardware for executing the same according to example embodiments.

FIG. 4 is not intended to suggest any limitation as to the scope of use or functionality of embodiments of the application described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 4, computer system/server 402 in cloud computing node 400 is displayed in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via a bus. It should be understood that although not displayed, other hardware and/or software components could be used in conjunction with computer system/server 402. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method performed by a terminating network, the method comprising:
    receiving a call alert message from an out-of-band network, the call alert message indicating a time period, a calling number, and a called number associated with a call originated by a call originator and terminated at the terminating network, wherein the calling number and the called number are provided to the out-of-band network via an SIP invite message from the call originator;
    receiving a call from an other network via a received calling number;
    determining that the calling number and the called number match the received calling number, and that the called number and the call were received within the time period; and
    pairing call content with the call in response to the determining.

2. The method of claim 1, comprising:
    parsing the SIP invite message to identify the calling number and the called number.

3. The method of claim 1, comprising:
    transmitting the call alert message to the terminating network via an application programming interface (API) of the out-of-band network.

4. The method of claim 1, wherein the SIP invite message is part of a pseudo call sent from the call originator to the out-of-band network, and wherein the method comprise-comprising:
    canceling the pseudo call after the out-of-band network identifies the calling number and the called number.

5. The method of claim 1, comprising:
    initiating another call from the call originator to the other network.

6. The method of claim 1, comprising:
    initiating a timer at the terminating network; and
    based on the timer, identifying that the call was received within a certain time frame.

7. The method of claim 1, comprising:
    determining the calling number and the called number based on the SIP invite message.

8. An apparatus comprising:
    a processor of a terminating network that executes instructions stored in a memory to configure the processor to:
        receive a call alert message from an out-of-band network, the call alert message indicating a time period, a calling number, and a called number associated with a call originated by a call originator and terminated at the terminating network, wherein the calling number and the called number are provided to the out-of-band network via an SIP invite message from the call originator; and
        determine that the calling number and the called number match a received calling number associated with a call from another network, and that the called number and the call were received within the time period, and
        pair call content with the call in response to the determination.

9. The apparatus of claim 8, wherein the processor is configured to:
    parse the SIP invite message to identify the calling number and the called number.

10. The apparatus of claim 8, wherein the processor is configured to:
    transmit the call alert message to the terminating network via an application programming interface (API) of the out-of-band network.

11. The apparatus of claim 8, wherein the SIP invite message is part of a pseudo call sent from the call originator to the out-of-band network, and wherein the processor is further configured to:
    cancel the pseudo call after the out-of-band network identifies the calling number and the called number.

12. The apparatus of claim 8, wherein the processor is configured to:
    initiate another call from the call originator to the other network.

13. The apparatus of claim 8, wherein the processor is configured to:
    initiate a timer at the terminating network; and
    based on the timer, identify that the call was received within a certain time frame.

14. The apparatus of claim 8, wherein the processor is configured to:
    determine the calling number and the called number based on the SIP invite message.

15. A non-transitory computer-readable medium comprising instructions that, when executed by a processor of a terminating network, cause the processor to perform:
    receiving a call alert message from an out-of-band network, the call alert message indicating a time period, a calling number, and a called number associated with a call originated by a call originator and terminated at the terminating network, wherein the calling number and the called number are provided to the out-of-band network via an SIP invite message from the call originator;
    receiving a call from an other network via a received calling number;
    determining that the calling number and the called number match the received calling number, and that the called number and the call were received within the time period; and
    pairing call content with the call in response to the determining.

16. The non-transitory computer-readable medium of claim 15, wherein the instructions cause the processor to perform:
    parsing the SIP invite message to identify the calling number and the called number.

17. The non-transitory computer-readable computer medium of claim 15, wherein the instructions cause the processor to perform:

transmitting the call alert message to the terminating network via an application programming interface (API) of the out-of-band network.

18. The non-transitory computer-readable medium of claim 15, wherein the SIP invite message is part of a pseudo call sent from the call originator to the out-of-band network, and wherein the instructions cause the processor to perform:
canceling pseudo call after the out-of-band network identifies the calling number and the called number.

19. The non-transitory computer-readable medium of claim 15, wherein the instructions cause the processor to perform:
initiating another call from the call originator to the other network.

20. The non-transitory computer-readable medium of claim 15, wherein the instructions cause the processor to perform:
initiating a timer at the terminating network; and
based on the timer, identifying that the call was received within a certain time frame.

* * * * *